(12) United States Patent
Graffin

(10) Patent No.: US 12,455,029 B2
(45) Date of Patent: Oct. 28, 2025

(54) PIPE AND CONTAINER TREATMENT FACILITY COMPRISING SUCH A PIPE

(71) Applicant: Serac group, La Ferte Bernard (FR)

(72) Inventor: André Jean-Jacques Graffin, Chicago, IL (US)

(73) Assignee: Serac group, La Ferte Bernard (FR)

( * ) Notice: Subject to any disclaimer, the term of this patent is extended or adjusted under 35 U.S.C. 154(b) by 160 days.

(21) Appl. No.: 17/919,141

(22) PCT Filed: Apr. 15, 2021

(86) PCT No.: PCT/EP2021/059833
§ 371 (c)(1),
(2) Date: Oct. 14, 2022

(87) PCT Pub. No.: WO2021/209571
PCT Pub. Date: Oct. 21, 2021

(65) Prior Publication Data
US 2023/0160509 A1    May 25, 2023

(30) Foreign Application Priority Data
Apr. 15, 2020    (FR) .................. FR2003788

(51) Int. Cl.
*F16L 27/08*    (2006.01)
(52) U.S. Cl.
CPC ............... *F16L 27/0857* (2013.01)

(58) Field of Classification Search
CPC ............... F16L 27/0857; F16L 27/0837; F16L 27/0804; F16L 27/0853; F16L 27/107;
(Continued)

(56) References Cited

U.S. PATENT DOCUMENTS 1,001,842 A * 8/1911 Greenfield .............. F16L 11/18
                                                   285/329
1,011,768 A * 12/1911 Fowler ...................... B67C 3/22
                                                   141/237
(Continued)

FOREIGN PATENT DOCUMENTS

CN    113818844 A  * 12/2021  ............. E21B 17/02
CN    115583627 A  *  1/2023  ............. B67C 3/026
(Continued)

*Primary Examiner* — Matthew Troutman
*Assistant Examiner* — Fannie Kee
(74) *Attorney, Agent, or Firm* — MUNCY, GEISSLER, OLDS & LOWE, P.C.

(57) ABSTRACT

A pipe includes at least one first section connected to a second section by a hinged element allowing a predetermined angular movement of the first section relative to the second section under a predetermined minimum force. The hinged element includes two end pieces connected respectively to the first section and to the second section and hinged with each other to allow the angular movement, and a tube having ends connected to the end pieces so as to be elastically deformable under the predetermined force according to the predetermined angular movement. The sections and the end pieces themselves are rigid under the predetermined minimum force. A treatment facility include such pipes.

14 Claims, 5 Drawing Sheets

(58) Field of Classification Search
CPC ........ F16L 11/18; E21B 17/015; E21B 17/02;
B65D 25/46; B65D 47/065; B67C 3/22;
B67C 3/26; B67C 3/34
USPC ...................................................... 222/527
See application file for complete search history.

(56) References Cited

U.S. PATENT DOCUMENTS

| | | | | |
|---|---|---|---|---|
| 2,140,187 | A * | 12/1938 | Kantor | B67C 3/06 |
| | | | | 141/49 |
| 2,738,993 | A * | 3/1956 | Wilson | F16L 27/107 |
| | | | | 285/298 |
| 3,112,128 | A * | 11/1963 | Knapp | F16L 27/0853 |
| | | | | 285/146.1 |
| 3,378,067 | A * | 4/1968 | Leonard | E21B 17/015 |
| | | | | 166/350 |
| 3,410,493 | A * | 11/1968 | Dion-Biro | F16L 27/0853 |
| | | | | 239/587.3 |
| 3,475,039 | A | 10/1969 | Ortloff | |
| 3,915,482 | A * | 10/1975 | Fletcher | F16L 27/0857 |
| | | | | 285/226 |
| 4,109,097 | A * | 8/1978 | Berry | F16L 27/107 |
| | | | | 174/86 |
| 4,396,797 | A * | 8/1983 | Sakuragi | F16L 11/18 |
| | | | | 138/120 |
| 4,548,427 | A * | 10/1985 | Press | F16L 27/107 |
| | | | | 285/55 |
| 4,645,244 | A * | 2/1987 | Curtis | F16L 27/0857 |
| | | | | 285/226 |
| 5,197,767 | A * | 3/1993 | Kimura | F16L 11/18 |
| | | | | 403/114 |
| 5,865,378 | A * | 2/1999 | Hollinshead | F16L 11/18 |
| | | | | 239/587.5 |
| 8,047,236 | B2 * | 11/2011 | Perry | F16L 11/18 |
| | | | | 138/120 |
| 9,163,762 | B2 * | 10/2015 | French | F16L 27/0857 |
| 2003/0156893 | A1 * | 8/2003 | Takagi | F16L 27/0837 |
| | | | | 403/128 |
| 2003/0184086 | A1 * | 10/2003 | Christianson | F16L 11/18 |
| | | | | 285/146.1 |
| 2005/0103903 | A1 * | 5/2005 | Shamir | F16L 11/18 |
| | | | | 239/587.2 |
| 2009/0250924 | A1 * | 10/2009 | Tisbo | F16L 11/18 |
| | | | | 285/115 |
| 2013/0300106 | A1 * | 11/2013 | French | F16L 27/0857 |
| | | | | 285/237 |
| 2016/0025251 | A1 | 1/2016 | Uhler | |
| 2016/0137472 | A1 * | 5/2016 | Niehr | B67C 3/22 |
| | | | | 141/1 |
| 2017/0190553 | A1 * | 7/2017 | Costello | B67C 3/206 |
| 2018/0346306 | A1 * | 12/2018 | Carpino | B67C 3/281 |
| 2020/0224503 | A1 * | 7/2020 | De Lemos, Jr. | E21B 17/015 |
| 2020/0224816 | A1 * | 7/2020 | Schulz | F16L 11/18 |
| 2022/0373018 | A1 * | 11/2022 | Lokkinen | F16L 11/18 |

FOREIGN PATENT DOCUMENTS

| | | | | |
|---|---|---|---|---|
| DE | 3909839 | A1 * | 10/1989 | ............. F16L 11/18 |
| DE | 102007014949 | A1 * | 9/2008 | ......... F16L 27/0857 |
| DE | 102011087001 | A1 * | 5/2013 | ............. F16L 11/18 |
| DE | 202015100087 | U1 * | 3/2016 | ............. F16L 11/18 |
| DE | 102020129149 | A1 * | 5/2022 | ............ B67C 3/026 |
| EP | 0616971 | A1 * | 9/1994 | ............ B67C 3/026 |
| EP | 2465813 | A1 | 6/2012 | |
| EP | 2998631 | A1 * | 3/2016 | ............. E21B 17/02 |
| FR | 2882128 | A1 * | 8/2006 | ............. F16L 11/18 |
| FR | 2971322 | A1 * | 8/2012 | ........... E21B 17/015 |
| FR | 3027371 | A1 | 4/2016 | |
| GB | 204600 | A | 10/1923 | |
| GB | 2306257 | A * | 4/1997 | ............. F16L 11/18 |
| GB | 2428760 | A * | 2/2007 | ............. F16L 11/18 |
| IT | BO20060376 | A1 * | 11/2007 | ............ B67C 3/026 |
| JP | 62193743 | A * | 8/1987 | ............. F16L 11/18 |
| WO | WO-2010112141 | A2 * | 10/2010 | ............... B65B 3/22 |
| WO | WO-2012168702 | A1 * | 12/2012 | ........... E21B 17/015 |
| WO | WO-2017086943 | A1 * | 5/2017 | ............. E21B 17/02 |
| WO | WO-2019/051576 | A1 | 3/2019 | |
| WO | WO-2020011357 | A1 * | 1/2020 | ............ B67C 3/026 |

* cited by examiner

PIPE AND CONTAINER TREATMENT FACILITY COMPRISING SUCH A PIPE

The present invention relates to the field of circuits for transporting fluids, and more particularly for transporting liquids. The invention also relates to the field of processing containers, And by way of example, such processing may comprise totally or partially filling the container with a liquid, or spraying a liquid into the container.

BACKGROUND OF THE INVENTION

There exist fluid transport circuits that include at least one pipe having a first end connected to a first element and a second end connected to a second element that is movable relative to the first element.

Thus, in certain container-filling installations, a pipe has a first end connected to a tank at a fixed height, and a second end connected to a filler nozzle with a plunger spout that is movable relative to the tank. On each container-filling cycle, the spout is inserted into the container down to the vicinity of a bottom of the container before beginning to deliver the liquid, and then the spout is raised progressively as the liquid is filling. The pipe is thus subjected to repeated movements so as to enable the plunger spout to move down each time over a height that is greater than the height of the container.

In such applications, it is known to have recourse to pipes that are elastically deformable or that are hinged.

Using elastically-deformable pipes presents drawbacks, in particular in high-speed installations having rotary platforms, with rotation of the platforms also giving rise to deformation of the pipes. The range of materials that can be selected for making the pipe is also restricted, in particular because of the material must withstand the liquids being transported and must be chemically inert relative to those liquids. Also, in certain applications associated in particular with transporting liquids that are perishable, it is necessary for the pipes to be cleaned or even sterilized periodically by using a liquid at a relatively high temperature that the pipe material must be capable of withstanding. As a result, pipes of that type are relatively fragile and needed to be changed relatively frequently.

A hinged pipe generally comprises a first segment and a second segment that are connected together by a hinge of axis perpendicular to the longitudinal axes of the segments. The hinge comprises a first tubular element with a bend, which element is secured to one end of the first segment, and is pivotally connected to a second tubular element with a bend that is secured to an end of the second segment. A flat sealing gasket is pressed between two bearing surfaces belonging respectively to the first element and to the second element, and it allows the bearing surfaces to pivot relative to each other, and thus allows angular deflection of the first segment relative to the second segment. That type of hinge is relatively fragile, and the sealing tends to degrade relatively quickly when the relative movements of the segments are abrupt and numerous.

OBJECT OF THE INVENTION

A particular object of the invention is to provide a pipe that allows relative movements between its ends and that remedies the above-mentioned drawbacks, at least in part.

SUMMARY OF THE INVENTION

To this end, according to invention, there is provided a pipe comprising at least a first segment and a second segment connected together by a hinged element allowing a predetermined angular deflection of the first segment relative to the second segment under a predetermined minimum force. The hinged element comprises two endpieces connected respectively to the first segment and to the second segment and hinged to each other to allow the angular deflection, and a tube having ends connected to the endpieces in order to be elastically deformable under the predetermined force over the predetermined angular deflection, the segments and the endpieces themselves being rigid under the predetermined minimum force.

Thus, the pipe is generally rigid except at the hinged element. This provides greater latitude in selecting the materials to be used for making the rigid segments and endpieces of the pipe. Also, hinging the endpieces together and fastening them to the segments limits the stresses to which the tube is subjected, thereby improving the reliability of the connection between the segments while allowing the required deflection. In particular, it is possible to use a commercially available tube of appropriate diameter that is merely adjusted to the appropriate length in order to be housed between the endpieces.

Preferably, the tube possesses longitudinal elasticity and has two mutually opposite ends, each provided with a transverse terminal face; and each endpiece has an annular bearing surface against which a respective one of the terminal faces of the tube is kept pressed under the effect of the longitudinal elasticity of the tube.

The invention also provides a container-processing installation, the installation comprising a movable support having mounted thereon a liquid delivery circuit and delivery spouts that are vertically movable and that are connected to the liquid delivery circuit by pipes of the above-described type.

Other characteristics and advantages of the invention appear on reading the following description of a particular and nonlimiting embodiment of the invention.

BRIEF DESCRIPTION OF THE DRAWINGS

Reference is made to the accompanying drawings, in which.

DETAILED DESCRIPTION OF THE INVENTION

Figure 1:
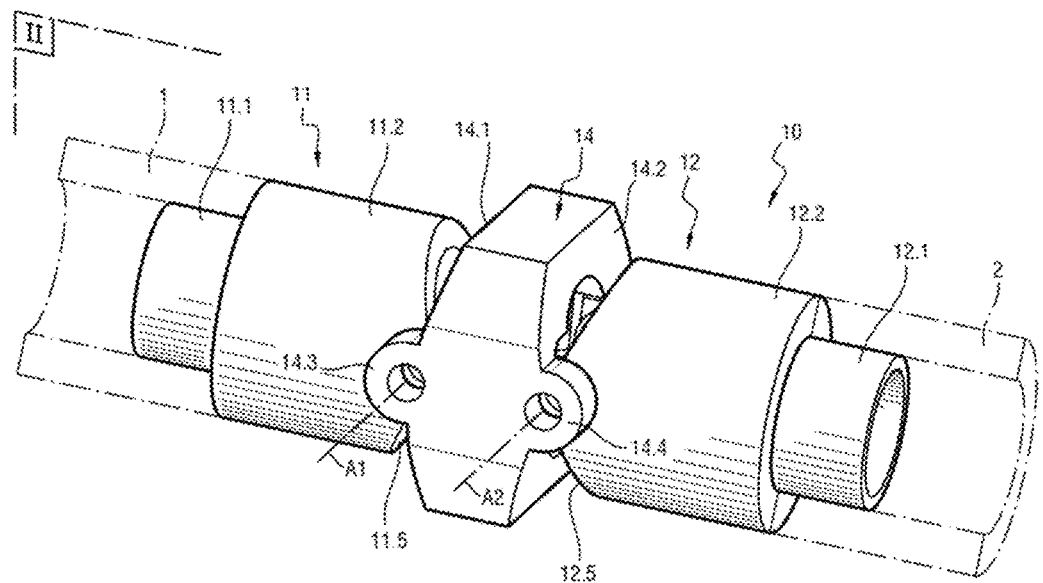
FIG. 1 is a fragmentary diagrammatic view in perspective of a pipe in a first embodiment of the invention, while in a rectilinear state.
Figure 2:
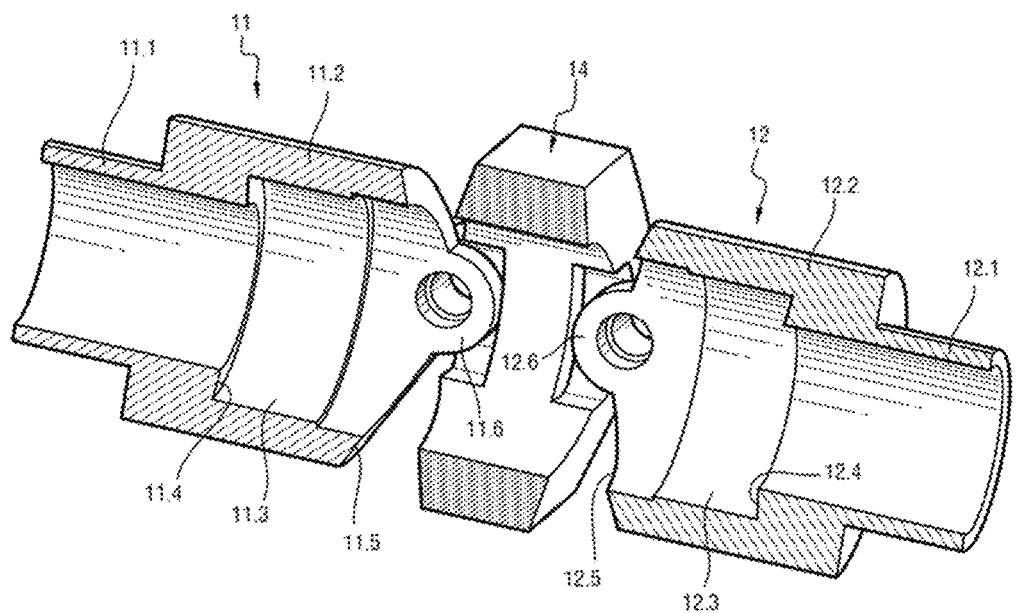
FIG. 2 is a fragmentary diagrammatic view in perspective of the same pipe in a rectilinear state, shown in section on the longitudinal midplane II of FIG. 1 and without the tube.
Figure 3:
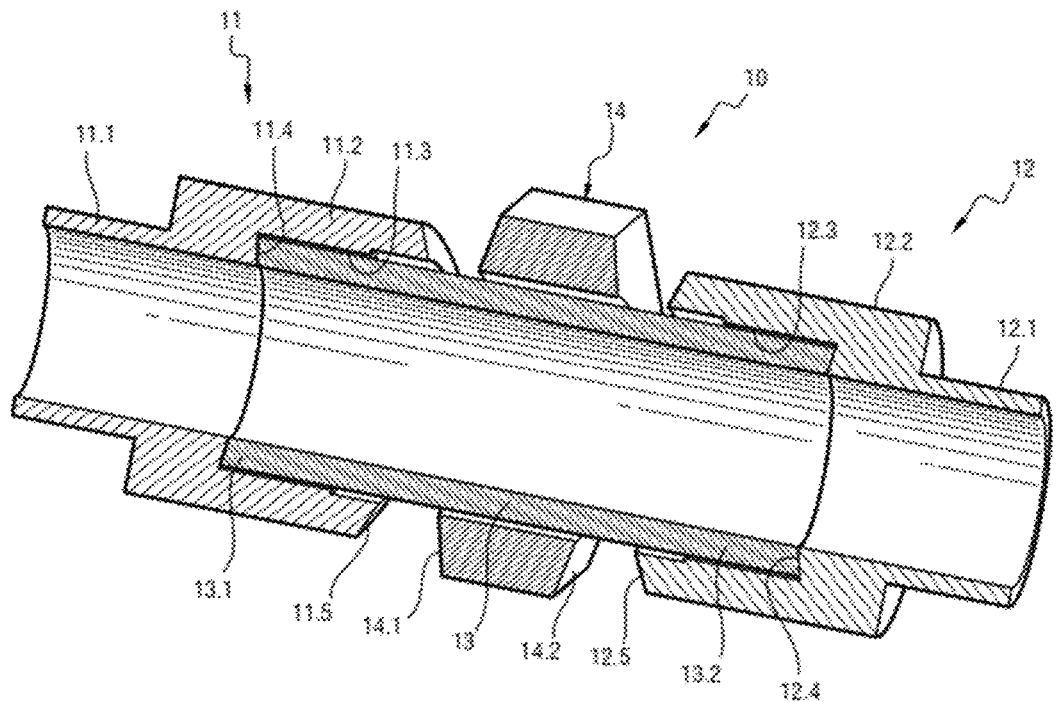
FIG. 3 is a view analogous to the view of FIG. 2 showing the same pipe in a rectilinear state together with the tube.
Figure 4:
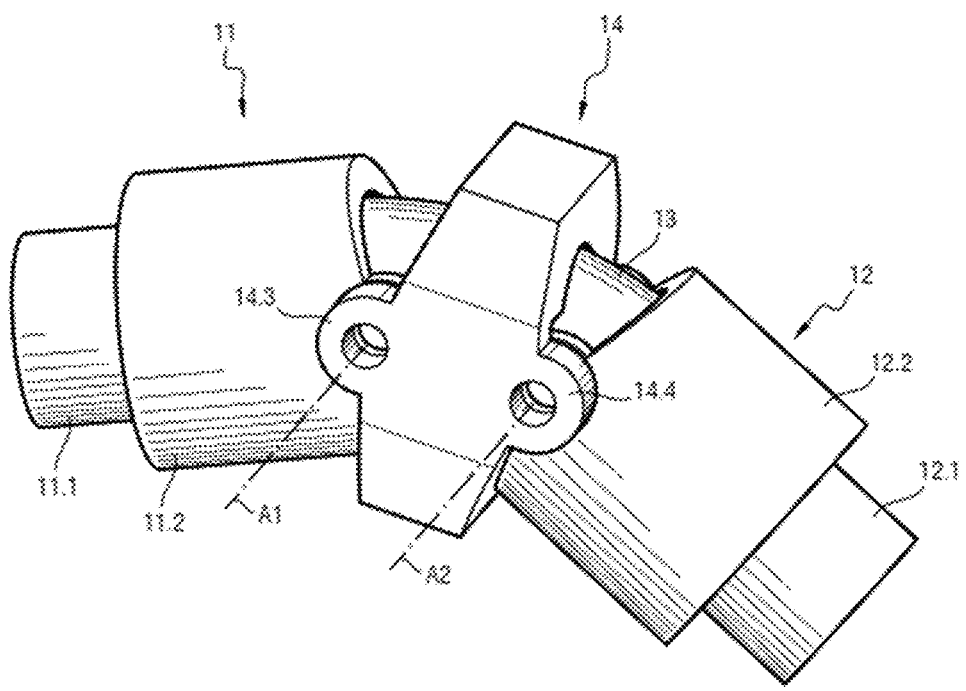
FIG. 4 is a view analogous to the view of FIG. 1 showing the same pipe, but in a curved state.
Figure 5:
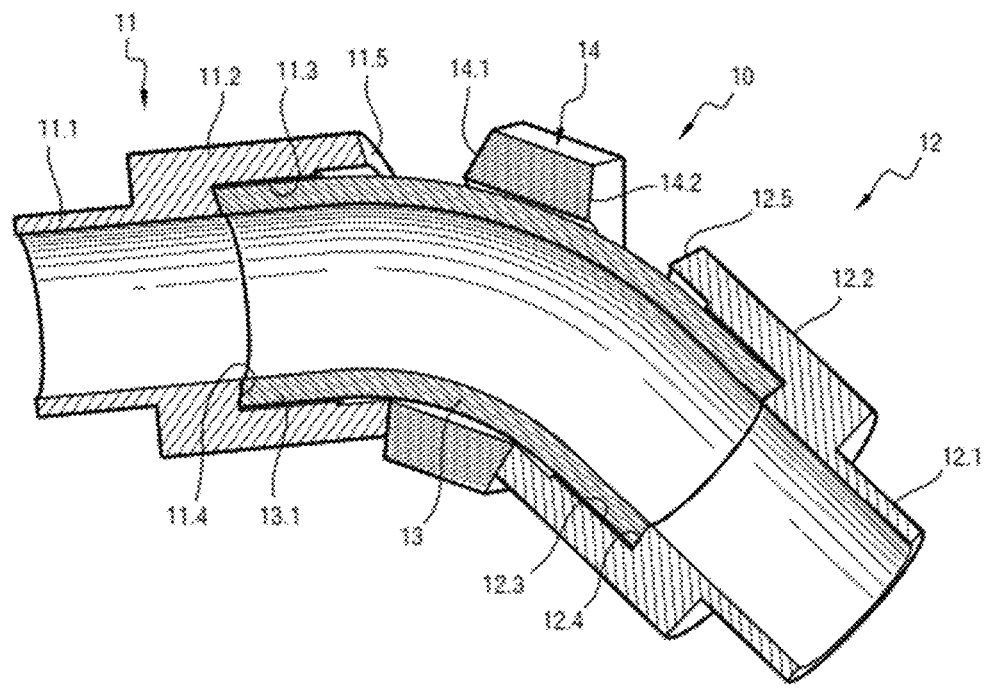
FIG. 5 is a view analogous to the view of FIG. 3 showing the same pipe in a curved state together with the tube.

With reference to FIGS. 1 to 6, the pipe in the first embodiment comprises at least a first segment 1, a second segment 2, and a hinged element, given overall reference 10, connecting together the first and second segments 1 and 2.

The hinged element 10 comprises a first tubular endpiece 11 connected to the first segment 1 and a second tubular endpiece 12 connected to the second segment 2 and hinged to the first endpiece 11.

The first endpiece 11 has a first end 11.1 engaged in the segment 1 and a second end 11.2 arranged to receive a first end 13.1 of a tube 13. For this purpose, the second end 11.2 includes a counterbore 11.3 that is defined by a cylindrical wall and that possesses an annular end wall 11.4 forming a bearing surface for a terminal face of the first end 13.1 of the tube 13. The end wall 11.4 is of convex frustoconical shape so as to penetrate a little into the first end 13.1 of the tube 13, thereby enhancing contact of the tube 13 against the side wall of the counterbore 11.3. The counterbore 11.3 possesses an inlet opening surrounded by a terminal edge 11.5 made up of two sloping surfaces converging towards two lugs 11.6, each of which is provided with a hole. The holes are on the same axis. It should be observed that the counterbore 11.3 in this example is stepped and comprises both an end segment (adjacent to the end wall 11.4) of diameter substantially equal to the outside diameter of the tube 13, and also an inlet segment (adjacent to the terminal edge 11.5) of diameter greater than the diameter of the end segment.

The second endpiece 12 has a first end 12.1 engaged in the segment 2 and a second end 12.2 arranged to receive a second end 13.2 of the tube 13. For this purpose, the second end 12.2 includes a counterbore 12.3 that is defined by a cylindrical wall and that possesses an annular end wall 12.4 forming a bearing surface for a terminal face of the second end 13.2 of the tube 13. The end wall 12.4 is of convex frustoconical shape so as to penetrate a little into the second end 13.2 of the tube 13, thereby enhancing contact of the tube 13 against the side wall of the counterbore 12.3. The counterbore 12.3 possesses an inlet opening surrounded by a terminal edge 12.5 made up of two sloping surfaces converging towards two lugs 12.6, each of which is provided with a hole. The holes are on the same axis. It should be observed that the counterbore 12.3 in this example is stepped and comprises both an end segment (adjacent to the end wall 12.4) of diameter substantially equal to the outside diameter of the tube 13, and also an inlet segment (adjacent to the terminal edge 12.5) of diameter greater than the diameter of the end segment.

The hinged element 10 has at least one spacer 14 that extends between the endpieces 11 and 12 and around the tube 13. The spacer 14 is annular in shape and has two terminal edges 14.1 and 14.2, each made up of two sloping semi-annular surfaces converging towards two lugs 14.3 and 14.4, each of which is provided with a hole. The holes are on the same axis.

The spacer 14 is connected to the first endpiece 11 by two first hinge pins A1 passing through the lugs 14.3 and 11.6, and to the second endpiece 12 by two second hinge pins A2 passing through the lugs 14.4 and 12.6.

The tube 13 is elastically deformable so as to allow a predetermined angular deflection a of the first endpiece 11 relative to the second endpiece 12 under a predetermined minimum force. In contrast, the segments 1 and 2, the spacer 14, and the endpieces 11 and 12 are rigid under the predetermined minimum force.

Thus, opposite from the lugs 14.3 and 14.4, the spacer 14 possesses two diametrically-opposite portions between the endpieces 11 and 12, which portions form abutments for the endpieces 11 and 12 so as to prevent the predetermined angular deflection a being exceeded. It should be observed that the maximum predetermined angular deflection (shown in FIGS. 4 and 5) is defined by:

the angles relative to the central axes as formed by the terminal edges 11.5 and 12.5 of the endpieces 11 and 12 where they face said abutment-forming portions; and the angle formed between the terminal edges 14.1 and 14.2.

It can be understood that the tube 13 is preferably maintained in a state in which it is lightly compressed longitudinally between the end walls 11.4 and 12.4 that form annular bearing surfaces against which the terminal faces of the tube are kept pressed because of the longitudinal elasticity of the tube 13. When the endpieces 11 and 12 are connected to the spacer 14, the end walls 11.4 and 12.4 are spaced apart by a distance that is slightly shorter than the length of the tube 13 at rest so that the tube is lightly compressed axially (i.e. longitudinally). The longitudinal compression of the tube 13 preferably remains within its elastic domain so that the longitudinal elasticity of the tube 13 tends to keep the terminal faces pressed against the end walls 11.4 and 12.4, thereby providing contact sealing between said terminal faces and the end walls 11.4 and 12.4. Account should be taken of the pressure of the fluid in the pipe in order to determine the compression needed for maintaining sealing.

Sealing can be reinforced by the tube 13 pressing against the side walls of the counterbores 11.3 and 12.3 (i.e. the walls extending parallel to the central axis), but that is not essential.

Figure 6:
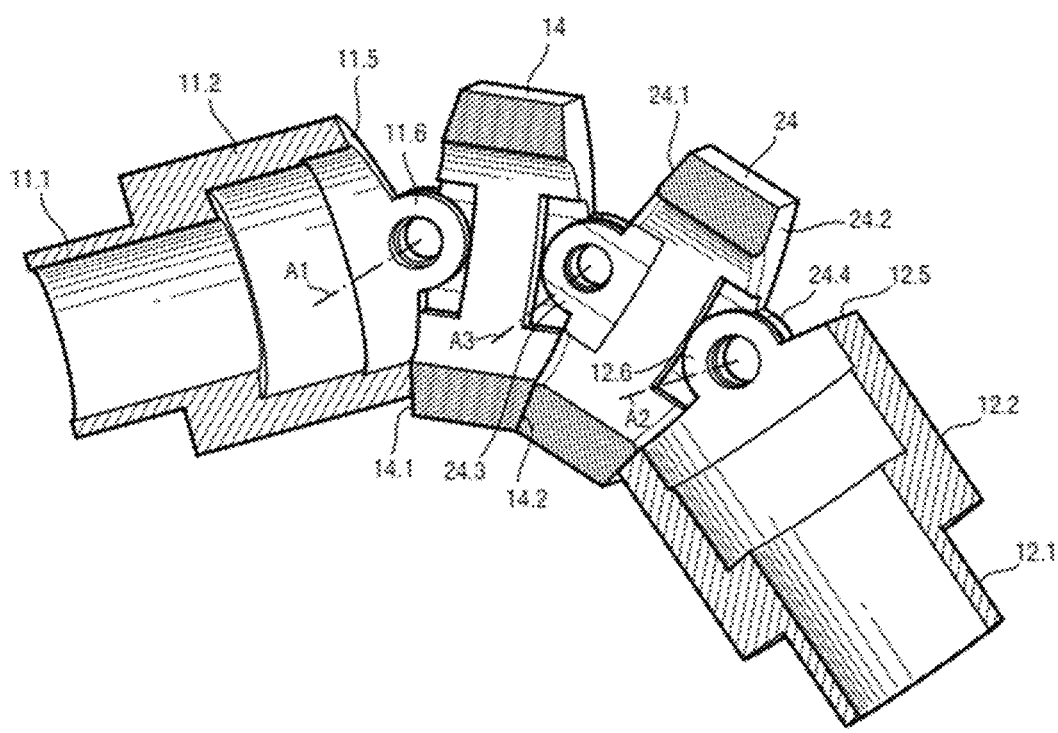
FIG. 6 is a view analogous to the view of FIG. 2 showing a variant of the first embodiment, the pipe being shown in a curved state and without the tube.

In the variant shown in FIG. 6, the pipe comprises, as above, two segments 1 and 2 connected together by a hinged element 10 that, as above, comprises two endpieces 11 and 12 and a spacer 14.

In this variant, the hinged element 10 further comprises a second spacer 24 adjacent to the spacer 14.

The spacer 24 extends around the tube 13 between the spacer 14 and the endpiece 12. The spacer 24 is annular in shape and has two terminal edges 24.1 and 24.2, each made up of two sloping semi-annular surfaces converging towards two lugs 24.3 and 24.4, each of which is provided with a hole. The holes lie on the same axis, and the lugs 24.3 are inwardly offset relative to the lugs 24.4 so that they can be inserted between the lugs 14.4.

The spacer 14 is connected to the first endpiece 11 by two first hinge pins A1 passing through the lugs 14.3 and 11.6, and to the endpiece 24 by two third hinge pins A3 passing through the lugs 14.4 and 24.3. The spacer 24 is connected to the second endpiece 12 by two second hinge pins A2 passing through the lugs 24.4 and 12.6.

This arrangement serves to limit the radius of curvature of the tube 13.

Figure 7:
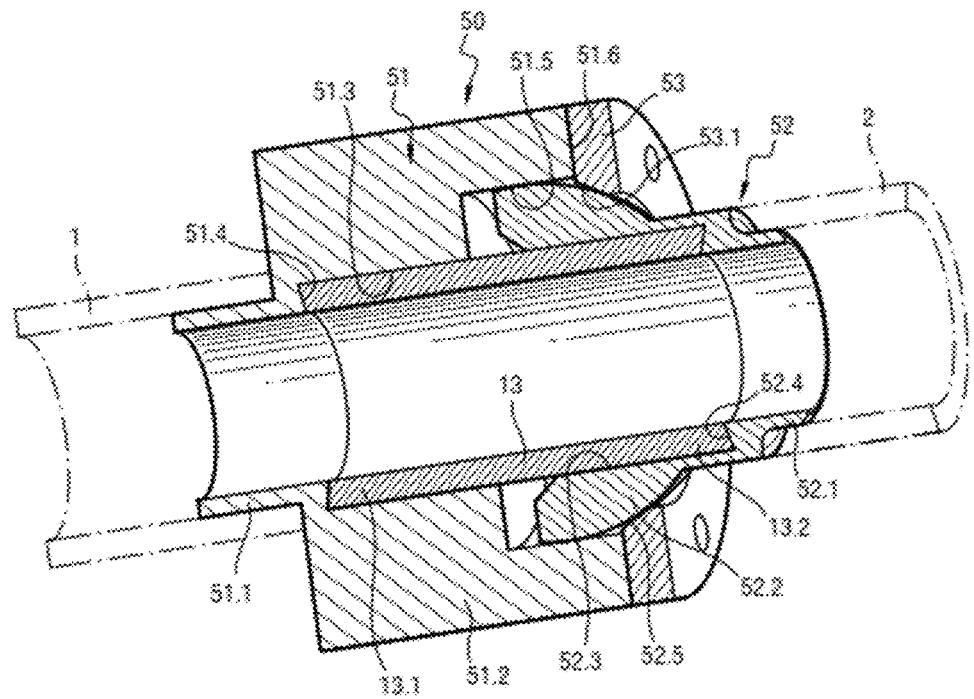
FIG. 7 is a fragmentary diagrammatic view in perspective of a pipe in a second embodiment, in a rectilinear state, shown in section on the longitudinal midplane and with the tube.
Figure 8:
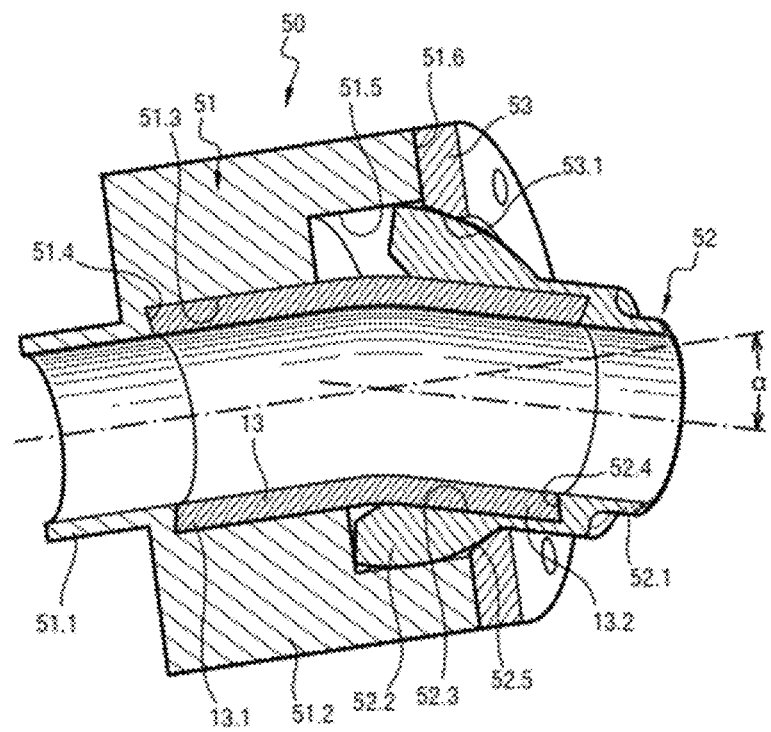
FIG. 8 is a view analogous to the view of FIG. 7 showing the same pipe, but in a curved state.

In the second embodiment shown in FIGS. 7 and 8, the pipe comprises a first segment 1 and a second segment 2 that are connected together by a hinged element 50.

In the second embodiment, The hinged element 50 comprises a first tubular endpiece 51 connected to the first segment 1 and a second tubular endpiece 52 connected to the second segment 2 and hinged to the first endpiece 51.

The first endpiece 51 has a first end 51.1 engaged in the segment 1 and a second end 51.2 arranged to receive a first end 13.1 of a tube 13. For this purpose, the second end 51.2 includes a counterbore 51.3 that is defined by a cylindrical wall and that possesses an annular end wall 51.4 forming a bearing surface for a terminal face of the first end 13.1 of the tube 13. The end wall 51.4 is of convex frustoconical shape so as to penetrate a little into the first end 13.1 of the tube 13, thereby enhancing contact of the tube 13 against the wall of the counterbore 51.3. Opposite from the end wall 51.4, the counterbore 51.3 opens out into a housing 51.5 possessing an inlet opening that is surrounded by a terminal edge 51.6 on which there is fastened a ring 53 having a frustoconical internal edge 53.1 facing towards the inside of the housing 51.5). It should be observed that the counterbore 51.3 has a diameter substantially equal to the outside diameter of the tube 13 and the housing 51.5 has a diameter greater than the diameter of the counterbore 51.3.

The second endpiece 52 has a first end 52.1 engaged in the segment 2 and a second end 52.2 arranged to receive a second end 13.2 of the tube 13. For this purpose, the second end 52.2 includes a counterbore 52.3 that is defined by a cylindrical wall and that possesses an annular end wall 52.4 forming a bearing surface for a terminal face of the second end 13.2 of the tube 13. The end wall 52.4 is of convex frustoconical shape so as to penetrate a little into the second end 13.2 of the tube 13, thereby enhancing contact of the tube 13 against the side wall of the counterbore 52.3. The counterbore 52.3 has a diameter substantially equal to the outside diameter of the tube 13. The second end 52.2 of the second endpiece 52 is received in the housing 51.5 of the first endpiece 51, and it is provided on the outside with a rounded bearing surface 52.5 with its convex face facing towards the first end 52.1. The rounded bearing surface 52.5 is in the shape of a spherical cap and it bears both against the wall of the housing 51.5 and also against the edge 53.1 of the ring 53 that partially closes the housing 51.5 and that prevents said end 52.2 from being extracted out from the housing 51.5. The housing 51.5, the edge 53.1, the end 52.2, and the rounded bearing surface 52.5 are shaped and sized so as to form a ball joint between the endpiece 51 and the endpiece 52 that allows the predetermined angular deflection of the second endpiece 51 relative to the first endpiece 52.

Figure 9:
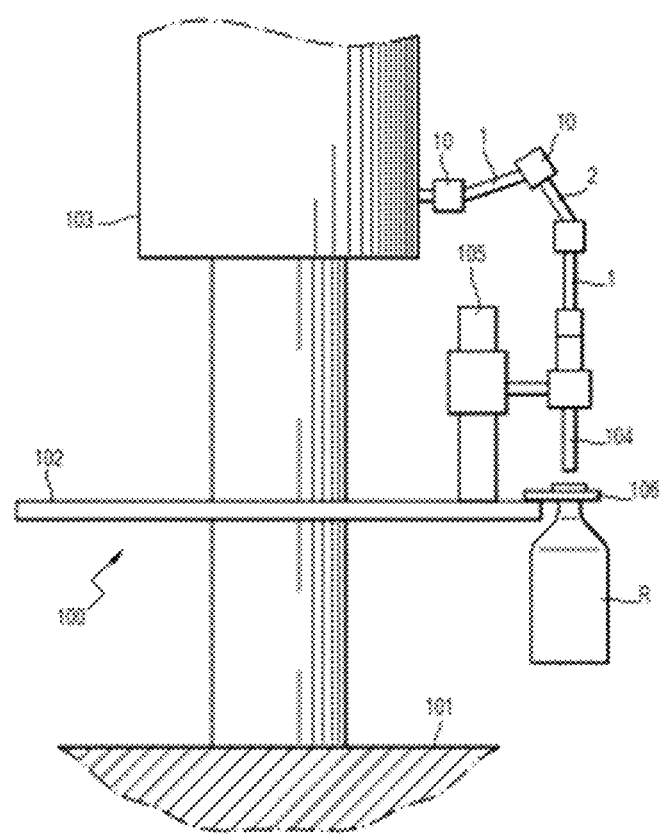
FIG. 9 is a diagrammatic elevation view of a container-filling installation having a plurality of pipes.

With reference to the diagram of FIG. 9, there follows a description of the pipe of the invention being used in a filler installation for filling containers R.

The filler installation, given overall reference 100, comprises a stand 101 having mounted thereon a movable support 102, specifically in the form of a rotary platform. The movable support carries a liquid delivery circuit 103, specifically in the form of a tank mounted in a central position, and filler spouts 104 (only one of which is shown in FIG. 9) arranged at the periphery of the movable support 102. The filler spouts 104 are mounted on columns 105 so as to be vertically movable between a low position and a high position. Vertically in register with each filler spout 104, the movable support 102 carries a container-gripper device 106, specifically a clamp, in such a manner that when the filler spout 104 is in its high position, it extends entirely outside the container R, and when it is in its low position, the bottom end of the filler spout 104 is in the vicinity of the bottom of the container R.

Each filler spout 104 has a top end connected to the delivery circuit 103 by a pipe that, in this example, comprises:
- a first hinged element 10 connected to the delivery circuit 103;
- a segment 1 connected to the first hinged element 10 and to a second hinged element 10;
- a segment 2 connected to the second hinged element 10 and to a third hinged element 10;
- a segment 1 connected to the second hinged element 10 and to the top end of the filler spout 104.

It can be understood that the successive angular deflections allowed by the hinged elements 10 enable the filler spout 104 to move vertically relative to the delivery circuit 103, which is itself at a fixed height.

The delivery circuit 103 is arranged to convey either liquid for filling the containers R or else cleaning and/or sterilizing and/or decontaminating liquids for cleaning/sterilizing/decontaminating the delivery circuit 103, the pipes, and the filler spouts 104.

The components of the pipes must therefore be made out of materials that are chemically compatible both with the liquid for packaging and also with the cleaning and/or sterilizing and/or decontaminating liquids that are used. For example, the segments 1 and 2, and the endpiece is 11 and 12 are made of stainless steel, and the tube 13 is made of silicone.

Also, the components of the pipes must thus be made of materials having properties that enable them to withstand the conditions under which the cleaning and/or sterilizing and/or decontaminating liquids are used, in particular in terms of temperature.

Naturally, the invention is not limited to the embodiments described, but covers any variant coming within the ambit of the invention as defined by the claims.

In particular, the endpieces may be male/male, female/female, or male/female endpieces (and the tube 13 may be connected to a female portion or to a male portion).

The annular bearing surfaces 11.4, 12.4, 51.4, and 51.5 of the endpieces may have surfaces that are plane instead of frustoconical.

In the first embodiment, the spacer is optional and serves merely to limit the radius of curvature of the tube. The endpieces 11 and 12 may be connected to each other directly by a hinge pin. Conversely, the hinged element may have more than two spacers.

The spacer 14 and need not be annular in shape, and for example it could comprise a pair of connecting links. The spacer could be partially annular in shape so as to have only one portion interposed between the endpieces 11 and 12 in order to form an abutment.

In the second embodiment, the edge 53.1 may be in the shape of a spherical cap.

In a variant, the rounded bearing surface 52.5 may be partially cylindrical in shape around a transverse axis of the second endpiece 52 and the ring 53 may include a surface portion of complementary shape to form a pivot connection about that axis instead of a ball joint.

Sealing elements may be provided to provide sealing between the endpieces and the ends of the tube independently of any axial compression of the tube.

The processing installation may be of a structure that is different from that described, and by way of example it may have a support that is movable in translation and not in rotation, or it may be arranged to sterilize containers.

The invention is applicable to other installations for transferring liquids.

The invention claimed is:

1. An installation for processing containers, comprising:
    a movable support having mounted thereon a liquid delivery circuit and delivery spouts vertically movable and connected to the liquid delivery circuit by a pipe assembly,
    wherein the pipe assembly comprises at least a first segment, a second segment, and a hinged element connecting the first segment to the second segment while allowing a predetermined angular deflection of the first segment relative to the second segment under a predetermined minimum force during displacement of the delivery spouts, wherein the hinged element comprises a first tubular endpiece connected to the first segment and a second tubular endpiece connected to the second segment and hinged to the first tubular endpiece to allow the predetermined angular deflection, wherein materials of the first segment, the second segment, the first tubular endpiece and the second tubular endpiece are rigid under the predetermined minimum force, wherein the hinged element comprises a tube having ends connected to the first tubular endpiece and the second tubular endpiece so as to be elastically deformable under the predetermined minimum force over the predetermined angular deflection, and wherein the endpieces are connected to each other by at least one hinge pin.

2. The installation according to claim 1, wherein the tube possesses longitudinal elasticity and has two mutually opposite ends, each provided with a transverse terminal face; and each endpiece has an annular bearing surface against which a respective one of the terminal faces of the tube is kept pressed under the effect of the longitudinal elasticity of the tube.

3. The installation according to claim 2, wherein each at least one of the ends of the tube is received in a counterbore of a corresponding one of the endpieces, each counterbore being provided internally with the annular bearing surface.

4. The installation according to claim 3, wherein the annular bearing surface is of convex frustoconical shape so as to penetrate a little into said end of the tube and enhance contact of the tube against a wall of the counterbore.

5. The installation according to claim 1, wherein the hinged element includes at least one spacer that extends between the endpieces and that is connected by a first hinge pin to the first endpiece, and by a second hinge pin to the second endpiece.

6. The installation according to claim 5, wherein the spacer is at least partially annular in shape and extends around the tube to have a portion that is interposed between the endpieces so as to provide the endpieces with an abutment to prevent the predetermined angular deflection being exceeded.

7. The installation according to claim 5, wherein the hinged element includes a plurality of adjacent spacers mounted between the endpieces.

8. The installation according to claim 1, wherein the second endpiece has a free end that is received in a housing of the first endpiece and that is provided externally with a convex rounded bearing surface bearing against an internal edge of a ring that partially closes the housing and that prevents said free end from being extracted out from the housing while allowing the predetermined angular deflection of the second endpiece relative to the first endpiece.

9. The installation according to claim 8, wherein the rounded bearing surface is in the shape of a spherical cap and the edge is frustoconical in shape.

10. A pipe assembly comprising at least:
a first segment;
a second segment; and
a hinged element connecting the first segment to the second segment while allowing a predetermined angular deflection of the first segment relative to the second segment under a predetermined minimum force, the hinged element comprising a first tubular endpiece connected to the first segment and a second tubular endpiece connected to the second segment and hinged to the first endpiece to allow the angular deflection, materials of the segments and of the endpieces being rigid under the predetermined minimum force, the hinged element including a tube having ends connected to the endpieces so as to be elastically deformable under the predetermined force over the predetermined angular deflection, and
the second endpiece having a free end that is received in a housing of the first endpiece and that is provided externally with a convex rounded bearing surface bearing against an internal edge of a ring that partially closes the housing and that prevents said free end from being extracted out from the housing while allowing the predetermined angular deflection of the second endpiece relative to the first endpiece.

11. The pipe assembly according to claim 10, wherein the rounded bearing surface is in the shape of a spherical cap and the edge is frustoconical in shape.

12. The pipe assembly according to claim 10, wherein the tube possesses longitudinal elasticity and has two mutually opposite ends, each provided with a transverse terminal face; and each endpiece has an annular bearing surface against which a respective one of the terminal faces of the tube is kept pressed under the effect of the longitudinal elasticity of the tube.

13. The pipe assembly according to claim 12, wherein each at least one of the ends of the tube is received in a counterbore of a corresponding one of the endpieces, each counterbore being provided internally with the annular bearing surface.

14. The pipe assembly according to claim 13, wherein the annular bearing surface is of convex frustoconical shape so as to penetrate a little into said end of the tube and enhance contact of the tube against a wall of the counterbore.

* * * * *